United States Patent [19]
Middendorf

[11] 3,761,006
[45] Sept. 25, 1973

[54] WELDING APPARATUS WITH GUIDE MEANS

[75] Inventor: Roy M. Middendorf, Greensburg, Ind.

[73] Assignee: Tree City & Tool Engineering Co., Inc., Greensburg, Ind.

[22] Filed: Nov. 8, 1971

[21] Appl. No.: 196,595

[52] U.S. Cl. .................................. 228/25, 228/27
[51] Int. Cl. ........................................... B23k 1/00
[58] Field of Search ..................... 228/7, 25, 27, 29; 266/23 K; 148/9; 90/62; 33/27 K, 174 G

[56] References Cited
UNITED STATES PATENTS

| | | | |
|---|---|---|---|
| 2,622,871 | 12/1952 | Martin | 90/62 X |
| 2,557,876 | 6/1951 | Klema | 33/23 K X |
| 2,464,351 | 3/1949 | Sharter | 148/9 |
| 2,303,473 | 12/1942 | Jones | 228/7 X |
| 2,300,698 | 11/1942 | Penty | 90/62 X |
| 2,062,380 | 12/1936 | Smith | 33/23 K |
| 1,809,653 | 6/1931 | Wagner et al | 219/125 R |

Primary Examiner—J. Spencer Overholser
Assistant Examiner—Robert J. Craig
Attorney—Joseph A. Naughton, Jr.

[57] ABSTRACT

A welding apparatus having means for guiding a welding tool along a predetermined path. A welding tool is mounted to a folding arm swingably mounted to the frame of the apparatus. A linkage rod is bearingly mounted to the arm and projects into a slotted template. A slotted chain guide bearingly receives a continuous roller chain which is driven at a uniform speed by a motor sprocket combination. The linkage rod is connected to the chain thus moving with the chain and forcing the arm and welding tool at a uniform speed along a path determined by the template slot. A tracer is mounted to the linkage rod. The template on either side of the slot receiving the linkage rod projects into the tracer thereby preventing sideways disengagement of the tracer and rod from the template slot.

13 Claims, 3 Drawing Figures

WELDING APPARATUS WITH GUIDE MEANS

BACKGROUND OF THE INVENTION

1. Field of the Invention

This invention is in the field of guides for tools; and more specifically, guides for welding tools.

2. Description of the Prior Art

When producing multiple units of an item requiring welding of metal components, automatic welding devices are utilized having predetermined tracking capabilities. Three such welding devices are shown in the following U.S. Pat. Nos. 1,809,653 issued to Wagner; 2,303,473 issued to Jones; and 3,417,979 issued to Cable. The welding tool disclosed in the Wagner patent is connected to a continuous chain which is driven through a predetermined path. The welding tool disclosed in the Cable patent is carried through a predetermined path by rollers which engage the inner edge of the template. The Jones patent discloses a rail for guiding the welding tool.

The guide means incorporated into the welding device must provide for the quick and easy change of the path along which the welding tool is guided. Many of the prior art devices are constructed in such a way so as to require major alterations in order to change the tool path. The apparatus disclosed herein has a guide means which may be quickly and easily dismantled allowing for the quick installation of a guide means having a different tool path.

Other devices for guiding the tool through a predetermined path employ magnetic means for driving the tool along the path. Two such devices are shown in the U. S. Pat. No. 2,464,351 issued to Shorter and 3,119,724 issued to Campbell. A tool for cutting glass is disclosed in the U. S. Pat. No. 2,026,109 issued to Walters. The Walters tool is driven along a predetermined path and is connected to a rotatably driven, continous roller chain which is driven through a relatively fixed path.

Another problem with the prior art devices is the inability to drive the welding tool along the predetermined path at a uniform speed. The path is typically irregular in configuration with many straight and curved portions. Thus, the speed of the tool is typically different through a curved portion of the path as compared to a straight portion of the path. For example, the tracing element typically moves at a faster speed around an external convex curved portion as compared to a straight portion of the path. In addition, the tracing element will typically move at a slower speed on an internal, concave curved portion. Thus, the welding tool is not driven at a uniform speed across the components to be welded. The quality of the weld is therefore inconsistent. The apparatus disclosed herein is constructed to drive the welding tool along a predetermined path at a uniform speed.

SUMMARY OF THE INVENTION

One embodiment of the present invention is an apparatus for guiding a tool along a path at a uniform speed comprising a device, a template having a first slot defining a desired tool path, guide means positioned in spaced relationship to the template and operable to guide the device along the tool path, drive means connected to the device and operable to move the device at a uniform speed along the tool path, a tracer connected to the device and engageable with and movable through the slot, and, connecting means attached to the tracer and connectable with a tool to be moved along the path.

It is an object of the present invention to provide an apparatus for moving and guiding a tool at a uniform speed along a predetermined path.

It is a further object of the present invention to provide a welding apparatus which has guide means for directing a welding tool along a path which may be quickly and easily changed.

Yet another object of the present invention is to provide a new and improved welding apparatus.

Related objects and advantages of the present invention will be apparent from the following description.

DESCRIPTION OF THE PREFERRED EMBODIMENT

Figure 1:
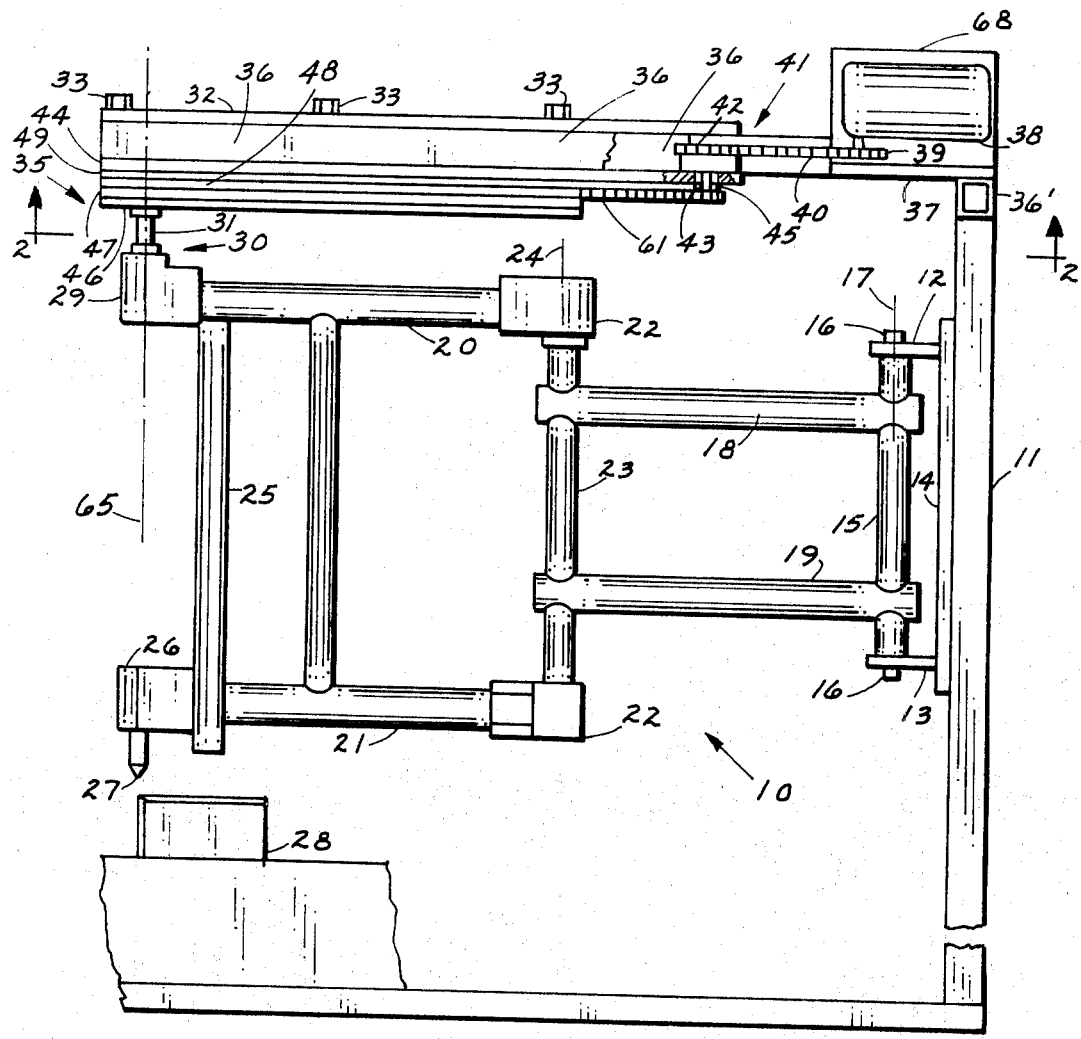
FIG. 1 is a fragmentary elevation of a welding apparatus with guide means incorporating the present invention.

Referring now to FIG. 1, there is shown a welding apparatus 10 with guide means 35 for guiding a welding tool 26 through a predetermined path. Welding apparatus 10 has a frame 11 which extends horizontally across the floor or other support and has vertically upstanding frame posts. The posts in frame 11 are shown fragmented to conserve drawing space. A pair of bracket arms 12 and 13 are integrally connected to a plate 14 fixedly secured to frame 11. Shaft 16 is fixedly connected to tube 15 and is pivotally mounted by conventional bearing means to brackets 12 and 13. A top arm 18 and bottom arm 19 are mounted at the top and bottom ends of tube 15 and may be pivoted along with tube 15 about axis 17 which extends centrally through shaft 16. The top and bottom arms are identical with their outer ends fixedly secured to shaft 23. A pair of outer arms 20 and 21 are mounted to shaft 23 by standard bearing couplings 22. Arms 20 and 21 may be pivoted about axis 24 which extends centrally through couplings 22 and shaft 23. Post 25 is fixedly secured to the distal ends of arms 20 and 21. A welding tool 26 is mounted to the lower portion of post 25 and has a welding tip 27 extending downwardly above the metal parts 28 to be welded. A holder 29 is fixedly mounted to the top portion of post 25 and to the distal end of arm 20. Holder 29 has a bearing socket 30 which bearingly receives linkage rod 31 extending upwardly into the guide means 35. Axis 65 extends centrally through welding tip 27 and rod 31 and is parallel with axes 17 and 24. Rod 31 is rotatable about axis 65.

Figure 3:
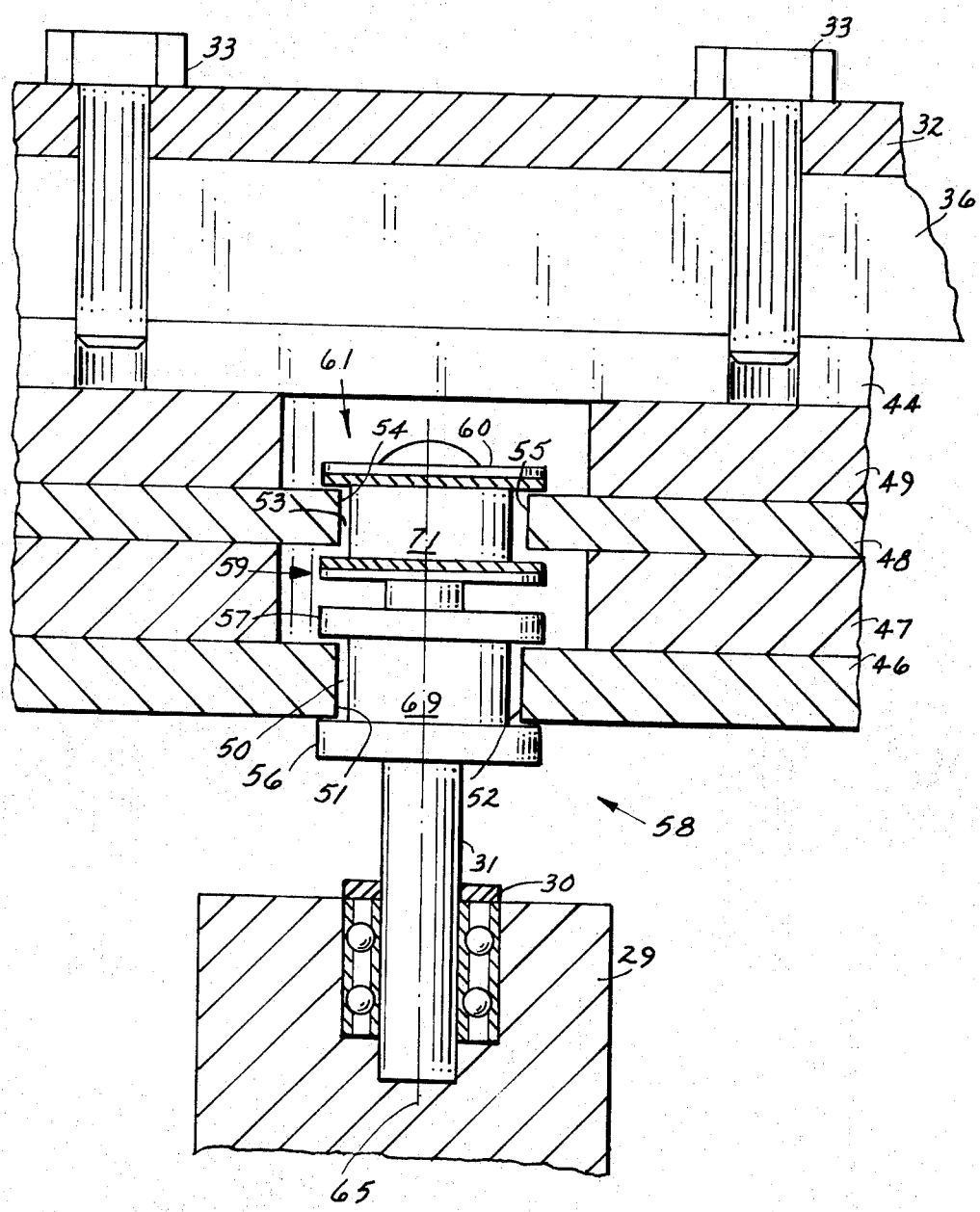
FIG. 3 is an enlarged fragmentary cross sectional view illustrating the positioning of tracer 58 in slots 50 and 53.

Guide means 35 is partially shown in cross section in FIG. 3. The guide means has a template 46 with a slot 50 defining the desired tool path. Axis 65 extends centrally through slot 50. A chain guide 48 is mounted to a spacer 47 which is mounted atop template 46. Chain guide 48 is provided with a slot 53 which is aligned with slot 50. Linkage rod 31 has tracer 58 mounted thereto which projects into slot 50. The tracer has a roller 69 with a pair of end walls 56 and 57 connected to the ends of the roller. The roller is sized smaller than slot 50 whereas walls 56 and 57 project outwardly of the slot being positioned adjacent the horizontal surfaces of the template. The template extends into the tracer so as to bearingly receive the roller. Thus, as tracer 58 engages and moves through the length of slot 50, the tracer is prevented from sideways disengagement with the slot. Rod 31 projects upwardly from tracer 58 and is secured to device 61, which is a chain. The chain is provided with a plurality of rollers 71 mounted to and between linkage plates 59 and 60. The rollers are sized so as to fit within slot 53 whereas the linkage plates 59 and 60 project outwardly on either side of slot 53 adjacent chain guide 48. Thus, guide 48 extends inwardly of plates 59 and 60 on either side of slot 53 which bearingly receives the chain. Spacers 47 and 49 are positioned sufficiently away from slots 50 and 53 so as to not interfere with tracer 58 and chain 61.

Crossbar 36' (FIGS. 1 and 2) is fixedly mounted atop the upstanding posts of frame 11. A pair of horizontal posts 36 are mounted to crossbar 36' and extend outwardly having guide means 35 mounted thereon. A top plate 32 rests atop bars 36 having a plurality of bolts 33 extending through plate 32 and bars 36 into mounting plate 44 of the guide means. Mounting plate 44 is positioned beneath and adjacent bars 36. A plurality of conventional fastening devices 34 (FIG. 2), such as bolts, secure template 46, chain guide 48 and spacers 47 and 49 to mounting plate 44. To remove the template and chain guide from the guide means, fasteners 34 are removed and a new template and chain guide are mounted to the mounting plate.

One of the support bars 36 is shown fragmented in FIG. 1 to illustrate the positioning of an electric motor 38 which is mounted to bracket 68. A plate 37 is secured to crossbar 36' and one of the outwardly extending bars 36 by welding or other suitable fastening means and has the bracket 68 mounted thereon. The electric motor has a downwardly extending drive shaft with the drive sprocket 39 mounted thereon in meshing engagement with a continuous chain 40. A sprocket assembly 41 is rotatably mounted to plate 44 having a top sprocket 42 and a bottom sprocket 43. Sprocket 42 is in meshing engagement with flexible, continuous roller chain 61. Thus, by rotating the output drive shaft of motor 38, chain 61 is caused to move through slot 53. Conventional bearings 45 are provided in plate 44 to receive the shaft of sprocket assembly 41.

OPERATION

Figure 2:
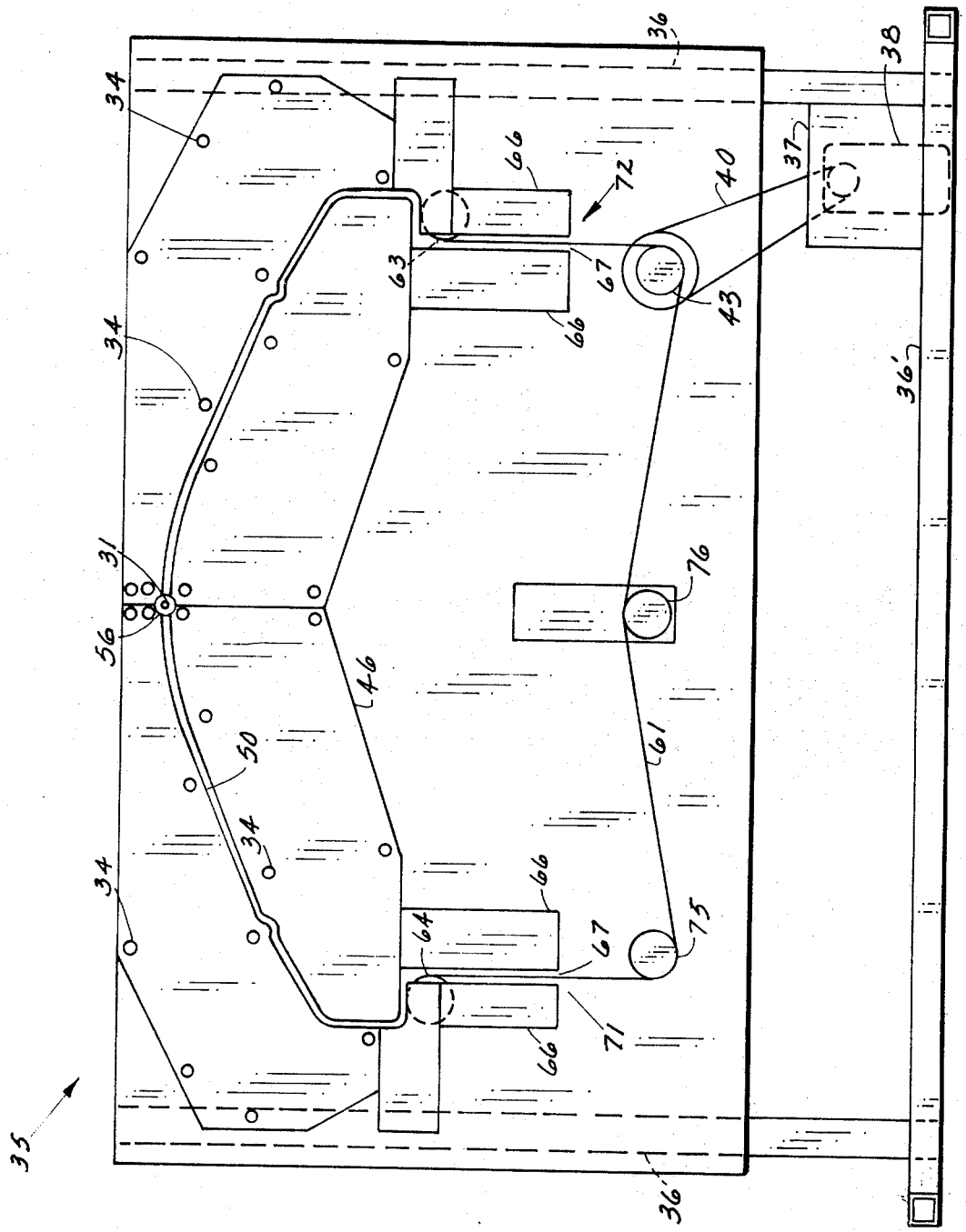
FIG. 2 is a cross sectional view taken along the line 2—2 of FIG. 1 and viewed in the direction of the arrows.

To operate the welding apparatus with guide means disclosed herein, the parts 28 to be welded are positioned beneath the welding tip 27. Suitable clamping means are provided to hold the parts in place while the parts are being welded. The electric motor 38 is activated with the output drive sprocket 39 being rotated at a constant rotational speed. Thus, chain 61 will be driven at a constant linear speed. the chain 61 is driven until linkage rod 22 is positioned at the entrance of slot 50. This position is shown in FIG. 2 by the arrow 71. The chain is then continuously driven at a constant speed so as to cause the spindle 31 to move from position 71 through slot 50 provided in the template 46 until the linkage rod reaches the end of the slot indicated by arrow 72. While the linkage rod is moving from position 71 to position 72, the welding tool is activated so as to weld the components together along the path defined by slot 50. Alternately, the chain could be driven in the opposite direction so as to cause the linkage rod to move from position 72 to position 71 with the welding occurring during the movement of the rod from position 72 to position 71. Since chain 61 is positioned at all times immediately above slot 50, and since the chain 61 is being moved at a constant speed, welding tool 26 will also move at a constant speed along the path defined by slot 50. Tracer 58 will absorb the major portion of the lateral loads which may be exerted as linkage rod 31 is moved by chain 61. That is, the edges 51 and 52 (FIG. 3) of slot 50 will contact roller 69 thereby absorbing the major portion of the lateral force. The edges 54 and 55 of slot 53 may contact chain 61; however, the chain is a roller chain and sufficiently flexible to prevent damage to the chain. As the major portion of lateral loads are taken by the tracer bearing 69, and it is easily replaceable if it wears, wear on the chain 61 is minimized and maintenance of the equipment is simplified.

A pair of entrance plates 66 are mounted to plate 44 at positions 71 and 72 defining slot 67. Slot 67 may be slightly larger than slot 50 so as to allow for the easy entrance of the tracer in case the tracer is carried out of the guide means by chain 61. Guide sprockets 63, 64, 75 and 76 are rotatably mounted to plate 44 and are in meshing engagement with chain 61 therefore aligning the chain with slot 50. Assuming arms 18 – 21 are sufficiently long, linkage rod 31 may be carried beyond plates 66 disengaging slot 50 subsequent to the welding of th parts. In this case, it is necessary that tracer 58 be fixedly secured to rod 31 so as to ensure that the tracer is in vertical alignment with template 46.

Many variations in the apparatus are contemplated and included by this specification. For example, welding tool 26 may be mounted to post 25 in such a manner so as to permit relative movement between the welding tip and the post. Thus, the welding tip could be adjusted to position the weld on either side of the part edges being joined. Also, the slots formed in template 46 and guide plate 48 which have concave and convex edges could be eliminated and instead the tracer and chain could be driven around the convex edge of a template or a concave edge formed by an opening in the template.

The invention claimed is:

1. Apparatus for guiding a tool along a path at a uniform speed comprising:
   drive belt means;
   a template having a first slot defining two dimensionally a desired tool path;
   a belt guide positioned in spaced relationship to said template and operable to guide said belt means parallel to said tool path;
   drive means connected to said drive belt means and operable to move said drive belt means at a uniform speed;
   a tracer connected to said drive belt means and engageable with and movable through said slot and guided by said slot during movement therethrough; and,
   connecting means attached to said tracer and connectable with a tool to be moved along said tool path.

2. The apparatus of claim 1 wherein:
   said drive belt means is a continuous flexible chain; and, said drive means is an electric motor and a sprocket in driving engagement with said chain.

3. The apparatus of claim 2 wherein:

said belt guide includes guide plate means mounted to said template, and said plate means provide a second slot aligned with said first slot; and, said chain is a roller chain with end walls, said plate means extending inwardly of said end walls on both sides of said second slot for bearingly receiving said chain.

4. The apparatus of claim 1 wherein:

said tracer has a pair of spaced apart guide walls connected together and a roller disposed therebetween, said guide walls being positioned externally of said template; and, said template extends inwardly of said guide walls bearingly receiving said roller.

5. The apparatus of claim 4 wherein:

said connecting means is a rod extending through said tracer and connected to said belt means.

6. The apparatus of claim 4 wherein:

said tool is a welding tool bearingly connected to said rod.

7. In a welding apparatus having a frame, a folding arm swingably mounted on said frame, a welding tool connected to said arm, the improvement which comprises:

a template having a slot defining two dimensionally the desired path of said welding tool;

a rod received by said arm;

a tracer mounted to said rod and engageably movable through said slot;

flexible belt means connected to said rod;

driving means connected to said belt means and operable to drive said belt means at a uniform speed; and, a belt guide spaced from said template and receiving said belt means.

8. The apparatus of claim 7 wherein:

said welding tool has a welding tip positioned centrally along a first axis extending centrally through said slot;

said folding arm swings about another axis parallel to and spaced from said first axis; and, said rod is a spindle rotatable about said first axis.

9. The apparatus of claim 8 and further comprising:

a first spacer connected to and between said template and said belt guide, said belt guide being a slotted plate;

a mounting plate connected to said frame; and, a second spacer connected to and between said mounting plate and said slotted plate.

10. The apparatus of claim 9 wherein:

said template extends on either side of said slot into said tracer preventing sideways disengagement therefrom.

11. Apparatus for guiding a tool along a tool path at a uniform speed comprising;

a stationary guide having convex and concave edges defining said tool path two dimensionally;

a first chain positioned adjacent and movable along said edges;

a connector connecting said tool to said chain; and, driving means connected to said chain and operable to move said chain at a uniform speed along said edges defining said tool path two dimensionally to thereby move said tool along said path.

12. The apparatus of claim 1 wherein:

said driving means includes a second chain, a motor drivingly engaging said second chain, a rotatably mounted rod with a first and second sprocket where said first sprocket engages said first chain and said second sprocket engages said second chain.

13. The apparatus of claim 11 and further comprising:

a template having a slot defining said tool path and in spaced relationship to said guide; and wherein:

said connector includes a rotatably mounted rod with a roller shaped wall slidable through said slot.

* * * * *

UNITED STATES PATENT OFFICE
CERTIFICATE OF CORRECTION

Patent No. 3,761,006  Dated September 25, 1973

Inventor(s) Roy M. Middendorf

It is certified that error appears in the above-identified patent and that said Letters Patent are hereby corrected as shown below:

Column 4, line 31, "th" should be --the--

Column 6, line 28, "claim 1" should be --claim 11--

Signed and sealed this 1st day of January 1974.

(SEAL)
Attest:

EDWARD M. FLETCHER, JR.  RENE D. TEGTMEYER
Attesting Officer  Acting Commissioner of Patents